Figure 1:
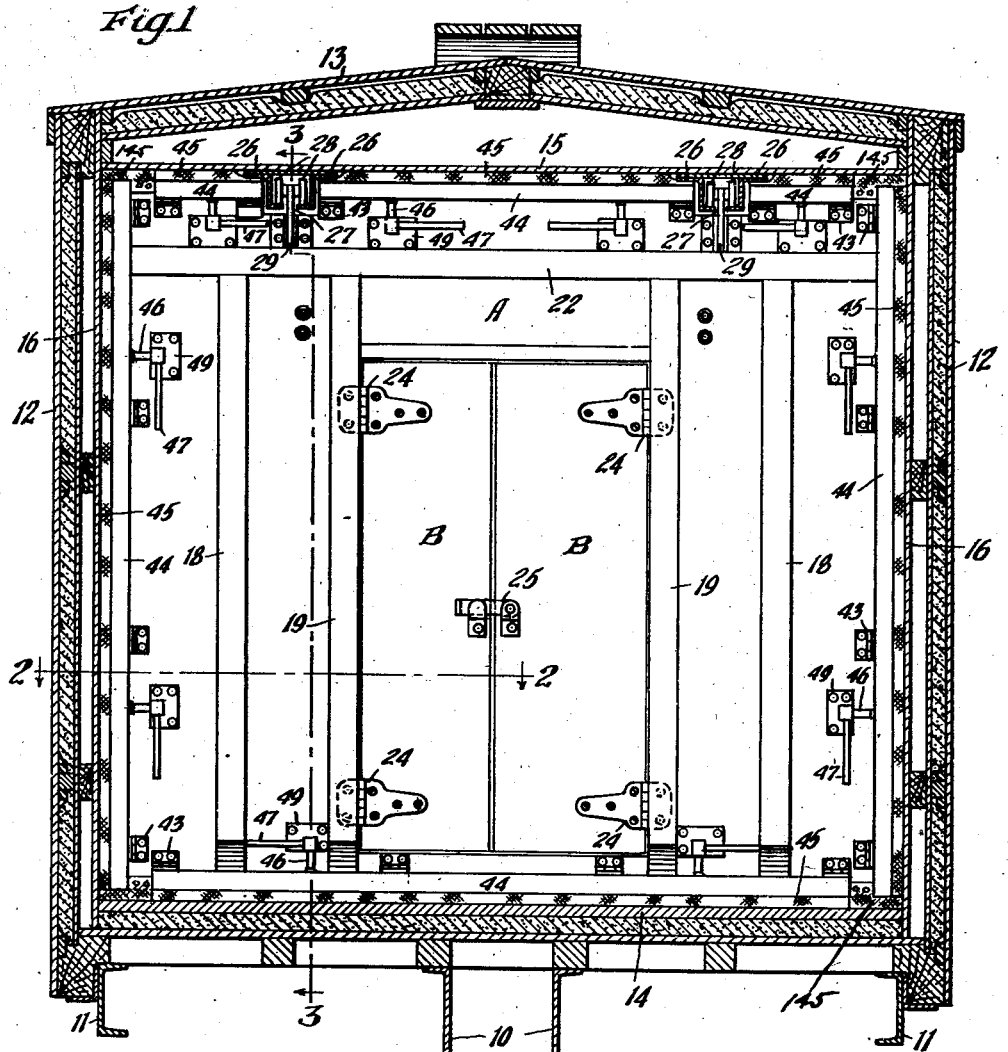

June 18, 1935.  L. JONES  2,005,086

MOVABLE PARTITION FOR VEHICLES

Filed July 21, 1934   2 Sheets-Sheet 1

Inventor
Les Jones

By Joseph Harris
his Atty.

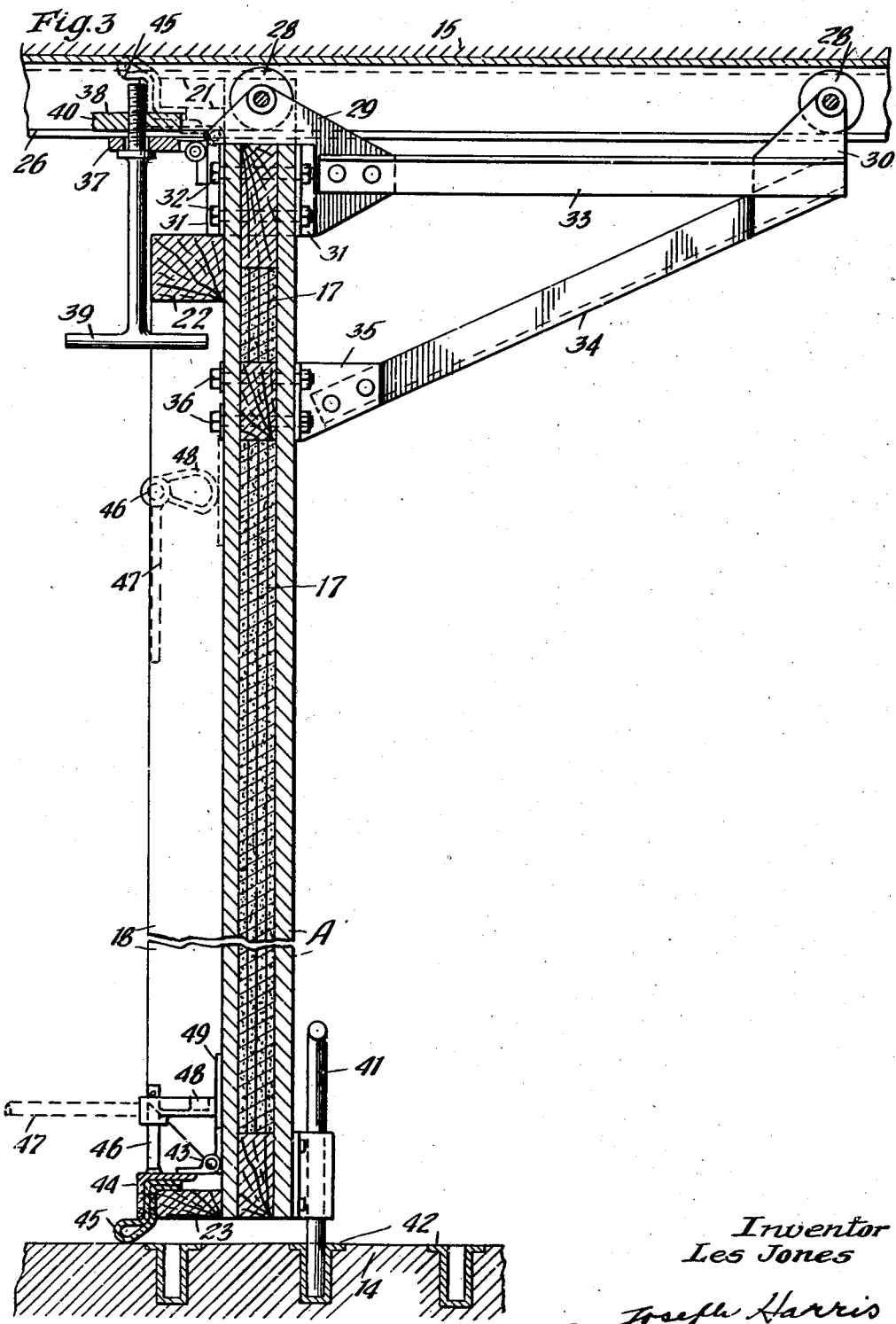

Patented June 18, 1935

2,005,086

UNITED STATES PATENT OFFICE 2,005,086

MOVABLE PARTITION FOR VEHICLES

Les Jones, Peoria, Ill., assignor to Premier-Pabst Corporation, Chicago, Ill., a corporation of Delaware Application July 21, 1934, Serial No. 736,360

11 Claims. (Cl. 105—376)

This invention relates to improvements in movable partitions for vehicles and more particularly, but not exclusively, to transverse partitions for refrigerator vehicles such as refrigerator cars.

In the transportation of certain commodities, which must be kept iced during transit, such as beer when shipped in refrigerator cars, it happens that in a large percentage of shipments, the quantity destined for a particular consignee is less than a carload lot. To keep down the freight charges and make economical use of the refrigerator cars, it is customary for the shippers to load each car fully with two or more less than carload lots for different consignees located along the same route and to unload the shipments destined for the different consignees at the different points along the route. Obviously, each car will be loaded first at its ends for those consignees farthest from the point of shipment and in the center of the car for the first consignee along the route, and the partial carload lots unloaded in the reverse order from that of loading through the usual side door openings of the car.

In the transportation of beer according to the customary method above indicated, the general practice has been to dispense with the usual ice bunkers at the ends of the car and, in lieu thereof, place quantities of ice directly on the tops of the beer containers. Due to the opening up of the car, to remove only a part of the load at each different point along the route as above described, it has heretofore been extremely difficult to maintain the desired low temperatures of the beer remaining in the car after each partial unloading. Another difficulty has been to maintain the lading, after a part thereof has been removed from the car, against shifting in the car due to shocks from sudden starting and stopping.

One object of the present invention is to provide simple and efficient means in a refrigerator car or similar vehicle which will permit of the complete segregation, within the car, of the different less than carload lots or partial loads in such manner that the temperature of each lot or portion of the load may be properly maintained at all times independently of the other lots or removal of any particular lot from the car prior to some other lot.

Another object of the invention is to provide means of the character indicated in the preceding paragraph in the form of a partition or transverse wall which may be readily adjusted so as to properly accommodate less than carload lots of different sizes from time to time.

Still another object of the invention is to provide, in a refrigerator car or the like, one or more partitions adjustable lengthwise of the car on its interior and wherein each partition is characterized by the same rigidity, strength and heat insulating qualities as the main walls of the car itself, and, when in desired adjusted and securely locked position, is effectively sealed with all of the fixed walls of the car body so as, in effect, to convert the car into a plurality of smaller size, individual and independent refrigerator car units, each of less than carload lot capacity.

Other specific objects of the invention are to provide an adjustable car partition or transverse wall having a door incorporated therein to permit of loading and unloading of the space behind the partition while the latter is in place; to provide novel and efficient means for obtaining an air seal between the partition and surrounding walls of the car body in any adjusted position of the partition; and to provide simple means for rigidly locking the partition in various adjusted positions.

Other objects of the invention will more clearly appear from the description and claims hereinafter following.

Figure 2:
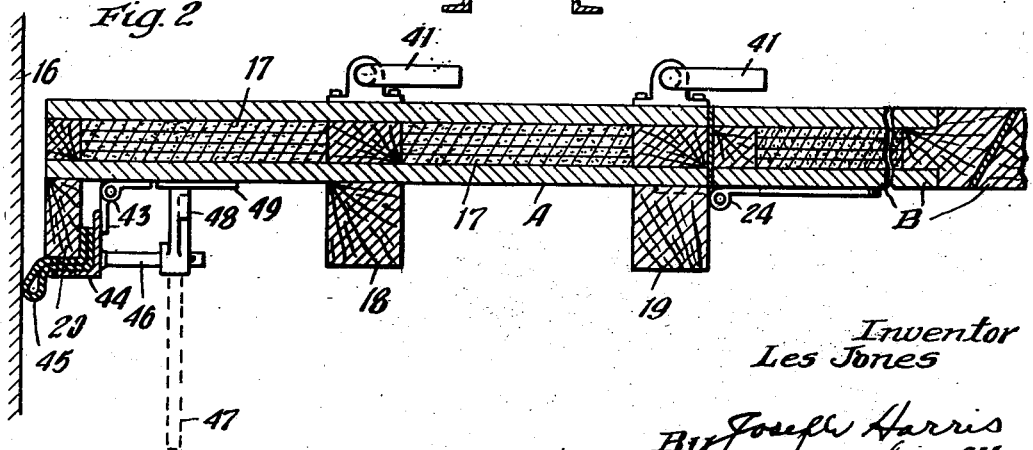

In the drawings forming a part of this specification, Figure 1 is a vertical, transverse sectional view of a refrigerator car showing the improvements incorporated therein. Figure 2 is an enlarged, horizontal sectional view corresponding substantially to the line 2—2 of Figure 1. And Figure 3 is an enlarged, vertical sectional view taken longitudinally of the car and corresponding substantially to the line 3—3 of Figure 1, parts being broken out to better accommodate the figure on the sheet.

In said drawings, the refrigerator car shown may be of any well known or conventional type, the one illustrated having center sills 10—10, side sills 11—11, insulated side walls 12—12, insulated roof 13, insulated floor 14 and ceiling or false roofing 15. The several insulated walls of the body of the car, as shown, comprise the usual inner and outer sheathings with insulating material therebetween and with the side walls provided with an additional spaced inner sheathing 16. As customary, the car will be provided with the two usual insulated side doors (not shown), and, when employed for the transportation of beer, will have the usual end ice bunkers removed so as to obtain the maximum load-carrying capacity of the car.

In carrying out the present invention, preferably two of the improved partitions will be employed, each to be located between the usual side door openings and an end of the car. As will be apparent, the number of partitions employed may be varied as desired especially because, as hereinafter pointed out, the improved partition has incorporated therein door closure means of a sufficient size to provide access to both sides of the partition so that, regardless of the number of partitions, access can always be obtained to every portion or compartment of the car for loading and unloading. In the drawings, only one partition has been shown in detail, since this is deemed sufficient for explanation of the invention.

As shown, the improved transverse wall partition A is of rigid construction with wood sheathing on both sides thereof and insulating material 17 interposed therebetween so that the partition A possesses the same elements of rigidity and heat insulating qualities as the main fixed walls of the car. The partition A is preferably made of slightly lesser width than the inside width of the car and of corresponding slightly lesser overall height than the interior height of the car so that the partition may be freely adjusted back and forth on the interior, as hereinafter explained. The rigidity of the partition is preferably increased by a plurality of vertical wood timbers 18—19 and 20 applied to one face thereof, preferably that face which is nearest the side door opening of the car when the partition is in place. Additional reinforcing or rigidifying horizontal timbers are employed as indicated at 21—22 and 23. In this connection, it will be noted that the timbers 20—21 and 23 are at the extreme vertical top, and bottom edges, respectively, of the partition so as to cooperate with the sealing devices, hereinafter described.

To provide access for the men who load and unload the car, to both sides of the partition in any adjusted position of the latter, for transferring the lading from either side of the partition, the latter is provided with a set of pivoted doors B—B hinged to the main portion of the partition, as indicated at 24—24, said doors being also of the usual insulated refrigerator car type adapted to provide an effective seal with the remaining portions of the partition when the doors are in closed position. The doors may be locked in closed position by any suitable means such as indicated conventionally at 25 and obviously are of such height and width as to readily permit a man to pass therethrough.

To permit of adjustment of the partition A, the following means are preferably employed. Secured to the under side of the false or sub-roofing 15 are two longitudinally extending tracks, each of which preferably consists of two Z-bars 26—26 with their webs extending vertically and their lower flanges extending toward each other horizontally but slightly spaced so as to leave an elongated slot or slit 27. Cooperable with each track 26—26 is a pair of double rollers 28—28, arranged to roll within the track on the upper faces of the lower flanges of the Z-bars, each twin pair of rollers 28 being rotatably journaled in a vertically extending plate 29 and 30, respectively, (see Fig. 3) the plates extending downwardly through the slot 27. The plate 29 is suitably secured to the upper portion of the partition A by brackets 31—31 and through bolts 32. The other plate 30 is rigidly associated with the partition by horizontal angle iron 33 riveted or otherwise rigidly secured to the plate 29, at one end below the track and to the plate 30 at its other end. To brace the roller supports, an inclined bracing angle 34 is employed extending from the plate 30 down to the partition to which it is rigidly secured as by the bracket plate 35 and bolts 36. With the roller bracket arrangements described, it is evident that the partition A will be maintained in a vertical position and may be rolled lengthwise of the car to any desired position therein.

To lock the partition in adjusted position, the following means are preferably employed. In line with each track, the partition has pivotally secured thereto at its top, a perforated plate 37 through which is freely extended the threaded end 38 of a T-handled operating bolt 39, the threaded end cooperating with a nut plate 40 slidable on the upper sides of the track bottom flanges. By suitably rotating the operating bolt 39, it is evident that the two plates 37 and 40 will be drawn together so as to firmly clamp the track and thereby frictionally hold the upper end of the partition. At the bottom, the partition has preferably mounted on the opposite side thereof, two slidable bolts 41, each adapted to engage in any one of a plurality of socket plates 42—42, positioned flush in the floor, as clearly shown in Figure 3.

To provide an effective air seal to check transference of air past the partition, the following means are preferably employed. Along each edge of the partition A and within the corresponding edge timber 20, 21 or 23, is pivotally attached to the partition, as by hinges 43—43, an angle iron 44 so arranged that, when in normal operative position as best shown in Figures 2 and 3, the inner flange of the angle will lie in a plane perpendicular to the partition and the outer flange will extend laterally outward parallel to the partition. Secured to each angle 44 and on the inside of the angle is a doubled over strip of rubber, canvas or other suitable flexible and compressible material, as indicated at 45, the loop of the doubled over strip being extended outwardly beyond the edge of the out-turned flange of the angle and adapted to engage the adjacent fixed wall, as clearly shown in Figures 2 and 3. In the case of the two vertical edges and bottom edge of the partition, one continuous angle 44 is employed on each edge, whereas along the upper horizontal edge of the partition, the sealing means is divided into three parts in order to accommodate the tracks and supports, as clearly shown in Figure 1.

To operate the sealing devices, each angle iron 44 preferably has rigidly secured thereto a short shaft 46 normally extending inwardly and parallel to the partition and on which is rotatably mounted a bell crank lever and cam 47—48, each cam 48 being adapted to engage a wear plate 49 fastened to the partition. With each cam lever 47—48, in the position as best indicated by the dotted lines in Figure 3, it is apparent that the corresponding sealing device to which it is attached, will be firmly clamped against the corresponding adjacent timber 20, 21 or 23 and a seal effected therewith and the space between the fixed portions of the partition and adjacent walls bridged by the loop portions of the flexible sealing strips proper. The longer sealing devices preferably have two sets of operating devices and the short sections only one, as shown. At the corners, small gaps will be present between the ends of the pivoted sealing elements and to close these gaps, pieces 145 of fabric may be employed, each directly attached to the partition. These will be pushed and wedged into the gaps by hand and will be of sufficient stiffness to remain there, thus effecting a complete air seal all around the partition.

With the construction shown and described, it is evident that each partition may be adjusted to any desired position lengthwise of the car and there rigidly locked in position and an effective seal made with the adjacent fixed walls including the floor, of the car body. In this manner, different sized lots of the commodity to be transported may be segregated in the several compartments of the car formed by the partitions and the temperature of each lot independently controlled by icing in each compartment. By employing an insulated partition with the sealing means therearound, temperature control is made completely effective in each compartment independent of every other compartment, thus permitting partial unloading of the car beginning first at the center of the car and then either end, as will be obvious. Furthermore, the partition, its mounting and locking means are such that the lading in each compartment can be effectively maintained against shifting equally as well as though the partition were a permanent wall of the car. By incorporating an insulated door in each partition, it is evident that the entire compartment formed behind a partition remote from the usual center side door of the car, may be completely filled and the icing placed therein after the partition has been locked in place and without the necessity of disturbing the partition to unload the compartment behind the partition. Where two or more partitions may be employed in each end of the car, thus dividing each half of the car into three or more compartments, the door construction of each partition obviously permits access to any compartment, regardless of the number of partitions. It will also be appreciated that, during the return trip of the car or at any time when icing of the lading is not required, the partitions may be shoved to the ends of the car so as to leave available a large pay load single compartment accessible from the usual side doors.

Although what is now considered the preferred embodiment of the invention has herein been shown and described, the same is intended as merely illustrative and not by way of limitation. All changes and modifications are contemplated that come within the scope of the claims appended hereto.

What is claimed is:

1. In a refrigerator car, a rigid transverse wall partition bodily adjustable lengthwise of the car, said partition being of only slightly lesser over-all height and width than the inside height and width of the car; means for fixedly retaining the partition in adjusted position, said partition having a door embodied therein of sufficient size to provide access of a workman to both sides of the partition while the latter is retained in any adjusted position thereof within the car.

2. In a refrigerator car, a permanently rigid heat-insulated transverse wall partition of similar characteristics to those of the car walls adjustable lengthwise of the car, said partition being of slightly lesser over-all height and width than the inside height and width of the car body; means, cooperable with the walls of the car, for retaining the partition in adjusted position, said means being releasable without destructive effect; and adjustable sealing devices around all edges of the partition adapted to bridge the gaps between the edges thereof and all the adjacent fixed walls including the floor of the car body to check air circulation past the partition around every edge.

3. In a refrigerator car, a rigid heat-insulated transverse wall partition adjustable lengthwise of the car, said partition being of slightly lesser over-all height and width than the inside height and width of the car body; means for retaining the partition in adjusted position; and adjustable sealing devices around the edges of the partition adapted to bridge the gaps between the edges thereof and the adjacent fixed walls of the car body to check air circulation past the partition, said sealing devices comprising elements pivoted to the partition and compressible means carried by the elements.

4. In a refrigerator car, a rigid heat-insulated transverse wall partition of permanently fixed dimensions adjustable lengthwise of the car, said partition being of slightly lesser over-all height and width than the inside height and width of the car body; means for retaining the partition in adjusted position; and adjustable sealing devices around the edges of the partition adapted to bridge the gaps between the edges thereof and the adjacent fixed walls of the car body to check air circulation past the partition, said partition having embodied therein an insulated door of sufficient size to thereby provide access of a workman to both sides of the partition and transference of a load.

5. In a vehicle, a rigid transverse wall partition adjustable lengthwise of the interior thereof; means for retaining the partition in adjusted position; and means around the respective edges of the partition for effecting an air seal with the corresponding adjacent fixed wall of the vehicle, each of said means including an angle iron pivotally mounted on the partition and a compressible sealing strip extending along, secured to and projecting beyond the edge of the angle.

6. In a vehicle, a rigid transverse wall partition adjustable lengthwise of the interior thereof; means for retaining the partition in adjusted position; means around the respective edges of the partition for effecting an air seal with the corresponding adjacent fixed wall of the vehicle, each of said means including an angle iron pivotally mounted on the partition and a compressible sealing strip extending along, secured to and projecting beyond the edge of the angle; and a cam lever cooperatively interposed between each said angle iron and the partition to lock the angle iron and associated strip in sealing position.

7. In a refrigerator car, an insulated rigid transverse wall partition adjustable lengthwise of the interior thereof and of over-all height and width slightly less than the inside height and width of the car body; means for retaining the partition in adjusted position, said partition having an insulated door incorporated therein to provide access to both sides of the partition; and adjustable sealing devices around the edges of the partition adapted to bridge the gaps between the edges thereof and respective adjacent walls of the car body, each of said devices including a metal plate pivotally attached to the partition and a flexible sealing strip secured along and extending beyond the edge of the plate.

8. In a refrigerator car, the combination with a transverse insulated rigid wall partition having an insulated pivoted door incorporated therein; means providing for adjustment of the partition lengthwise of the car, said means including an overhead track secured to the roof of the car body, a bracket secured to the partition, and rollers mounted on said bracket and cooperable with said track; means for locking the partition in adjusted position including a clamp carried by the partition and cooperable with the track; and adjustable means around the edges of the partition, cooperable with the respective adjacent fixed walls of the car body to effect an air seal therewith.

9. In a refrigerator car, the combination with a transverse insulated permanently rigid wall partition of dimensions corresponding substantially to the interior dimensions of the car body; of means providing for adjustment of the partition lengthwise of the car, said means including an overhead track secured to the roof of the car body and rollers carried by the partition and cooperable with said track; means for locking the partition in adjusted position including a clamp carried by the partition and cooperable with the track; and adjustable sealing devices around the edges of the partition and cooperable with the respective adjacent walls of the car body to provide an air seal therewith.

10. In a refrigerator car, an insulated rigid transverse wall partition adjustable lengthwise of the interior of the car body; cooperable track and roller supporting means on the ceiling of the car body and partition to thereby provide for adjustment of the partition lengthwise of the car; means located adjacent edges of the partition and cooperable with the respective adjacent walls of the car body for locking the partition in adjusted position; and means around the edges of the partition cooperable with the respective adjacent walls of the car body to effect an air seal therewith in adjusted positions of the partition.

11. In a refrigerator car, a heat-insulated transverse wall partition adjustable lengthwise of the car, said partition being of permanently fixed over-all height and width slightly lesser than the inside height and width, respectively, of the car body, said partition being also rigidified throughout and of such rigidity as to effectively resist shifting of the lading induced by movement of the car; means for retaining the partition in adjusted position; and sealing means around the edges of the partition, said sealing means being permanently fixed to the partition and adapted to be projected beyond the edges of the partition into contact with the adjacent fixed walls of the car body and retractable to non-contacting position.

LES JONES.